United States Patent [19]
Jorgensen

[11] Patent Number: 5,987,473
[45] Date of Patent: Nov. 16, 1999

[54] INTERACTIVE CONFIGURATION VIA NETWORK

[75] Inventor: Nielss Jorgensen, Hedehusene, Denmark

[73] Assignee: Beologic A/S, Herlev, Denmark

[21] Appl. No.: 08/998,727

[22] Filed: Dec. 29, 1997

[30] Foreign Application Priority Data

Sep. 9, 1997 [DK] Denmark ................................ 1031/97

[51] Int. Cl.$^6$ .................................................. G06F 17/30
[52] U.S. Cl. .............................. 707/104; 707/6; 707/103; 706/46; 706/47; 706/60; 364/221
[58] Field of Search .............................. 707/104, 7, 101, 707/10, 203, 102, 205, 6; 379/111, 34; 706/45, 60, 46, 52, 56, 47; 364/229, 221; 705/26; 345/329, 335, 333

[56] References Cited

U.S. PATENT DOCUMENTS

| | | | |
|---|---|---|---|
| 5,058,033 | 10/1991 | Bonissone et al. | 706/52 |
| 5,218,669 | 6/1993 | Kobayashi et al. | 706/47 |
| 5,515,524 | 5/1996 | Lynch et al. | 395/700 |
| 5,642,471 | 6/1997 | Paillet | 706/47 |
| 5,664,093 | 9/1997 | Barnett et al. | 706/45 |
| 5,701,400 | 12/1997 | Amado | 706/45 |
| 5,701,461 | 12/1997 | Dalal et al. | 707/4 |
| 5,768,353 | 6/1998 | Browne | 379/114 |
| 5,787,425 | 7/1998 | Bigus | 707/6 |
| 5,809,212 | 9/1998 | Shasha | 706/46 |
| 5,822,410 | 10/1998 | McCausland et al. | 379/111 |
| 5,844,554 | 12/1998 | Geller et al. | 345/333 |
| 5,850,539 | 12/1998 | Cook et al. | 395/500 |

FOREIGN PATENT DOCUMENTS

| | | |
|---|---|---|
| 0 666 534 A2 | 8/1995 | European Pat. Off. . |
| 0 687 987 A1 | 12/1995 | European Pat. Off. . |
| WO 97/15886 | 5/1997 | WIPO . |

OTHER PUBLICATIONS

Fossa, Halldor et al., "Interactive Configuration Management for Distributed Object Systems," IEEE, 1997, pp. 118–128.

Fossa, Halldor et al., "Implementing Interactive Configuration Management for Distributed Systems," IEEE, 1996, pp. 44–48.

*Primary Examiner*—Wayne Amsbury
*Assistant Examiner*—Thu-Thao Havan
*Attorney, Agent, or Firm*—Oliff & Berridge, PLC

[57] ABSTRACT

There is provided a method of controlling the flow of information in a client/server system for interactive configuration, wherein a request to a rule base is processed, comprising the steps of: providing request information, resulting from a first client interaction; transferring said request information to the server; collecting intermediate information, resulting from at least one second client interaction succeeding said first client interaction; creating response information on the server responsive to said request information; transferring said response information to the client; determining whether said response information indicates conformity with said rule base; creating merged information responsive to said intermediate information and said response information; determining whether said intermediate information represents a higher level of knowledge than said response information; selecting at least one of the following actions according to said determinations: use said merged information to update said client or transmit said merged information as a request.

102 Claims, 6 Drawing Sheets

INTERACTIVE CONFIGURATION VIA NETWORK

FIELD OF THE INVENTION

The invention relates to the field of controlling the flow of information in a client/server system for interactive configuration, wherein a request to a rule base is processed.

BACKGROUND OF THE INVENTION

In short, the general interactive configuration problem can be described as having a computer based model of a number of selectable objects, or selectable attributes of objects, and a number of rules that define constraints on the selectable objects and attributes. The configuration process is the process of selecting or deselecting objects or object attributes until a solution is found that satisfies all the constraints. During this configuration, the configuration engine will deduce consequences of the selections made, as well as interactively handling conflicting selections, and aiding the user in resolving these.

Traditionally, the configuration process in a client/server environment consisted in the user making a number of selections at the client side and then submitting the selections for validation by the server. This traditional way of operation has the serious drawback, that the user can end up with a set of selections that does not satisfy all the constraints, without having means of knowing exactly which selections caused the inconsistency. It may be likely that the user is forced to undo all selections in order to reach a valid state.

A computer system intended to solve a configuration problem is a special application of artificial intelligence where the problem can be stated in terms of a set of selectable elements and a number of relations between these selectable elements. The configuration problem is solved when the set of all selectable elements is completely divided into two disjunct sub-sets representing elements that are included in the configuration and elements that are excluded from the configuration, respectively, without violating any of the relations between the selectable elements.

A selectable element is anything that can be included or excluded. It can be a physical object (e.g. a car or a specific kind of engine), an attribute (e.g. the color red or the texture pattern of a carpet) or something abstract (e.g. a specific number of trips between home and work or a particular type of contract).

A relation is a rule involving one or more selectable elements. The purpose of a rule is to constrain the selection of elements to obey some requirements. A rule can be based on a physical limitation (e.g. if a car needs a large engine to support a large number of selected electrical accessories), or a discretionary decision (e.g. if management decides that all cars having a particular large engine are produced only in red color to give them a more sporty look). Often the term "constraint" is used to refer to a rule limiting how elements can be combined.

A configuration engine is the heart of a computer system for solving configuration problems. The configuration engine maintains a value for each selectable element reflecting the current knowledge of that element. The knowledge value is "unknown" to begin with, and can be set by either the user of the computer system or the configuration engine. Some examples of values are:

Selected, meaning that the user operating the computer system has chosen to positively include the element.

Discarded, meaning that the user operating the computer system has chosen to positively exclude the element.

Concluded, meaning that the Configuration Engine has deduced that the element must be included.

Rejected, meaning that the Configuration Engine has deduced that the element must be excluded.

Unbound, meaning that the Configuration Engine has deduced that the element may be either included or excluded.

Possibly concluded, meaning that the Configuration Engine has deduced that the element may be included but cannot be excluded.

Possibly rejected, meaning that the Configuration Engine has deduced that he element may be excluded but cannot be included.

Unknown, meaning that the configuration engine has no present knowledge of whether the element is included or not.

It is possible to define a partial ordering of knowledge values that reflects the level of knowledge which the configuration engine has about the element. An example of such an ordering is given in table 1 below:

TABLE 1

| Level | Knowledge Value |
|---|---|
| 3 | Selected, Discarded, Concluded, Rejected |
| 2 | Unbound |
| 1 | Possibly concluded, Possibly rejected |
| 0 | Unknown |

Table 1 shows the ordering of knowledge values.

Two values are said to be equivalent if they have the same effect on the set of selected elements. Using the example values in table 1, selected is equivalent with concluded and discarded is equivalent with rejected.

If two different values of the same element are compared, one value may overrule the other value if it has a higher associated knowledge level. If e.g. the value of an element is "unbound" in one part of the computer system and "selected" in another part of the system, then the value of "selected" may overrule the value of "unbound".

An element is defined as "free" if it is either unbound, possibly concluded, possibly rejected or unknown.

An element is defined as "bound" if it is selected, discarded, concluded or rejected.

The configuration engine uses the rules to assist the user in the selection process. This assistance can be more thorough, the more calculations the configuration engine is allowed to perform. It is possible to define the amount of assistance given to the user in terms of the deduction level reached by computations of the configuration engine. Some possible definitions of deduction levels are given below:

Validation is defined as the deduction level where all rules have been examined without finding any violations.

Propagation is defined as the deduction level where the first implications of the rules are computed. If e.g. a rule states "if A then B" and A is included (selected), propagation means that the configuration engine has deduced that B is also included (selected).

A deduction of consequences is a calculation by the configuration engine where at least the propagation level is reached.

A contradiction is defined as the situation where the user performs a choice to either include or exclude an element, following which the configuration engine is not able to reach a level of validation because at least one rule is violated.

CROSS REFERENCES

Reference is made to the following patent applications, filed the same day as this application and assigned to the same assignee, Beologic A/S:
(1) Ser. No. 08/998,629, Filing Date Dec. 29, 1997, Pending, A Method of Configuring a Set of Objects in a Computer
(2) Ser. No. 08/998,623, Filing Date Dec. 29, 1997, Pending, A Method and Apparatus for Inference of Partial Knowledge in Interactive Configuration
(3) Ser. No. 08/998,710, Filing Date Dec. 29, 1997, Pending, Method of Processing a Request to a Boolean Rule
(4) Ser. No. 08/998,621, Filing Date Dec. 29, 1997, Pending, A method of enabling Invalid Choices in Interactive Configuration Systems which are hereby incorporated as references to be understood in connection with the present invention.

SUMMARY OF THE INVENTION

A first object of the invention is to provide clients on a network with instant information on the consequences of selecting single items from a larger set of logically interrelated items.

A second object of the invention is to provide a method for efficient exchange of state information between a server and a client, and a unique method of synchronizing these otherwise asynchronous states.

A third object of the invention is to provide a method which limits both the interruptions imposed on the client by the server and the total number of requests issued by the client to the server.

The invention provides a method of controlling the flow of information in a client/server system for interactive configuration, wherein a request to a rule base is processed, comprising the steps of: providing request information, resulting from a first client interaction; transferring said request information to the server; collecting intermediate information, resulting from at least one second client interaction succeeding said first client interaction; creating response information on the server responsive to said request information; transferring said response information to the client; determining whether said response information indicates conformity with said rule base; creating merged information responsive to said intermediate information and said response information; determining whether said intermediate information represents a higher level of knowledge than said response information; selecting at least one of the following actions according to said determinations: use said merged information to update said client or transmit said merged information as a request.

According to the second object the invention provides a method which makes the delay between requests and responses to these requests introduced by, for example, a computer network, transparent to the end user (client).

According to the third object, the invention provides a method which results in a smooth user interface, i.e prevents or limits disturbing updates of the user interface, and which limits the data transport effort between the client and the server.

The invention further provides a method of controlling the flow of information in a client/server system for interactive configuration, wherein a request to a rule base is processed, comprising the steps of: providing request information, resulting from a first client interaction; transferring said request information to the server; collecting intermediate information, resulting from a second client interaction succeeding said first client activation; creating response information on the server responsive to said request information; transferring said response information to the client; said request, response, and intermediate information may comprise at least two types of information; client states which are provided as a result of a client interaction and server states which are provided as a result of server calculations; creating merged information responsive to said intermediate information and said response information; determining an action according to a strategy, at least comprising the following strategy: if said response information does not contain contradictions, then the client is updated with the merged information for at least some occurrences of request and response information; if said response information does not contain contradictions and said response information is not: equivalent with said client states in said intermediate information, then the client generates a new server request; if said response information contains contradictions, then a client interaction is requested for at least some combinations of said intermediate and said response information.

The invention also provides a method of controlling the flow of information in a client/server system for interactive configuration, wherein a request to a rule is processed, comprising the steps of: providing request information, resulting from a client interaction; transferring said request information to a server; creating response information on the server responsive to said request information; transferring said response state information to the client; creating merged information responsive to said request information and said response information; determining an action according to a strategy, comprising the following strategy: if said response information does not contain contradictions, then the client is updated with the merged information for at least some combinations of request and response information; if said response information contains contradictions, then a client interaction is requested for at least some combinations of request and response information.

The concept is unique in that the concept allows users on one side of a network connection to reach a complete and valid configuration with continuous assistance from a server on the other side of the network, without going through a trial-and-error process. This makes it significantly faster for the user to reach a valid solution.

As such, this invention is not concerned with the type of configuration engine or system used—other than requiring certain information to be available. Nor is it, in fact, concerned with the actual cause of the delay if any—such as a slow network, a slow configuration-engine, or a large number of simultaneous clients.

Further, the invention relates to a computer readable medium encoded with a program for performing the method as described above.

BRIEF DESCRIPTION OF THE DRAWINGS

The invention will be explained more fully below in connection with a preferred embodiment and with reference to the drawing, in which.

DETAILED DESCRIPTION OF THE INVENTION

Figure 1:
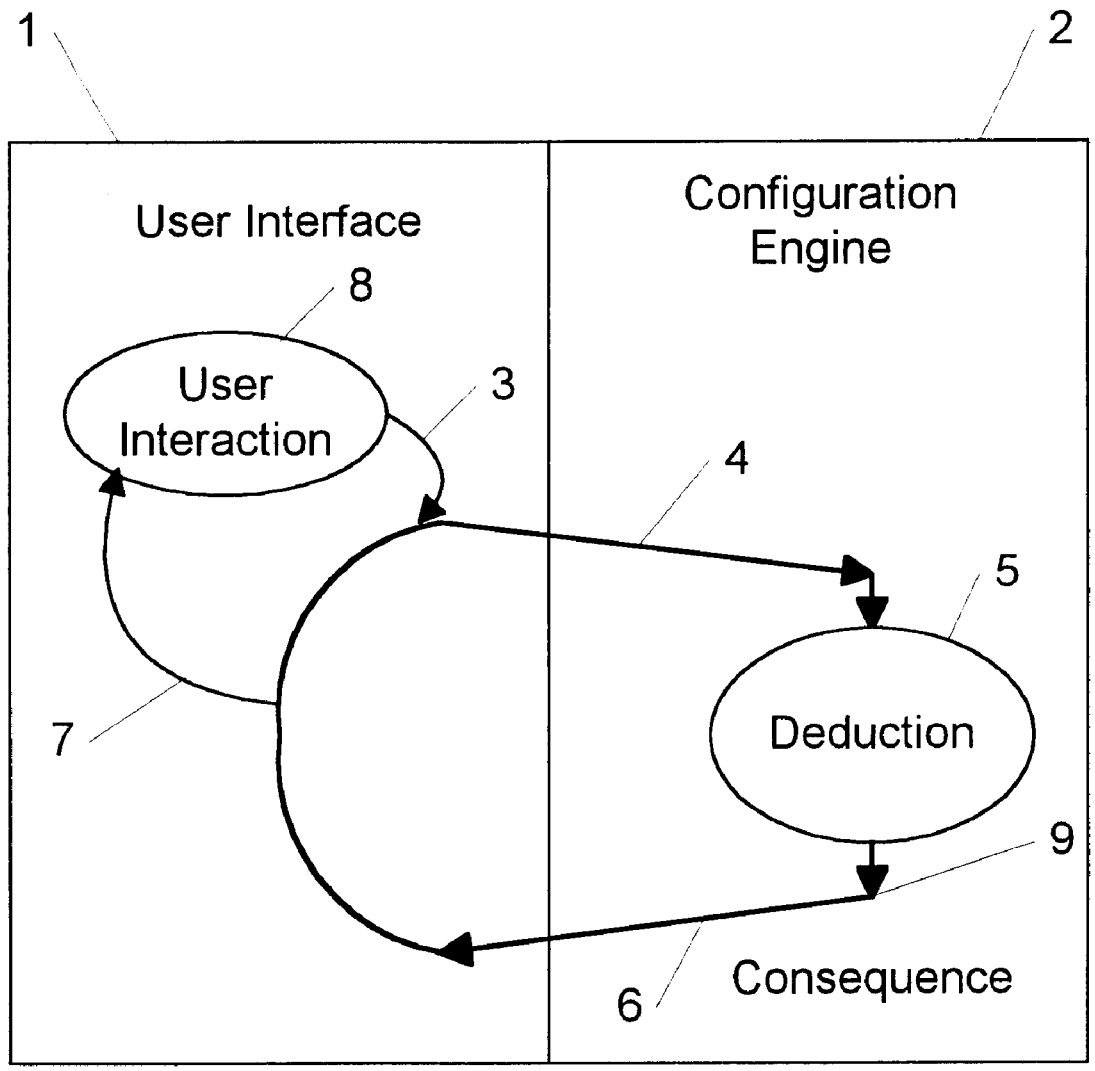
FIG. 1 shows a stand alone configuration system.

FIG. 1 shows a stand alone configuration system. The configuration system comprises a user interface 1 where a user makes selections. The user interface presents all selectable objects, or selectable attributes of objects, to the user, and accepts user selections 3. Whenever the user performs a selection, a request 4 is generated to the configuration engine 2. The configuration engine is responsible for holding the state information of all selectable objects or attributes during the configuration process. For each selectable object or attribute, the configuration engine registers whether the object or attribute is free for selection, is specifically selected or deselected by the user, or is selected (concluded) or deselected (rejected) as a result of a computation. The configuration engine also has access to at least one rule which defines the constraints on the selections. The configuration engine uses the rule base and the state information on all objects to calculate the consequences 9 of the user selection. If e.g. some rule says that selecting one object means that a second object must also be selected, the configuration engine will deduce this during the calculation 5 of consequences, and select the second object on the user's behalf.

When the deduction calculation 5 is terminated, the configuration engine builds a response 6 to the user. This response may contain information not only about the object or object attribute selected by the user at the user interface 1 in user interaction 8, but also on other selectable objects that were affected by the user's selection as a consequence of one or more of the rules.

The response generated by the configuration engine is used to provide an update 7 to the user interface with all the consequences of the selection, and the configuration system is prepared to accept the next user selection.

FIG. 1 illustrates a traditional approach of interactive configuration where a user must wait for the response to a command before making a second command, i.e. the configuration cycle 8, 3, 4, 5, 9, 6 and 7 is repeated without interruptions until the configuration process is finished, other things being equal.

Figure 2:
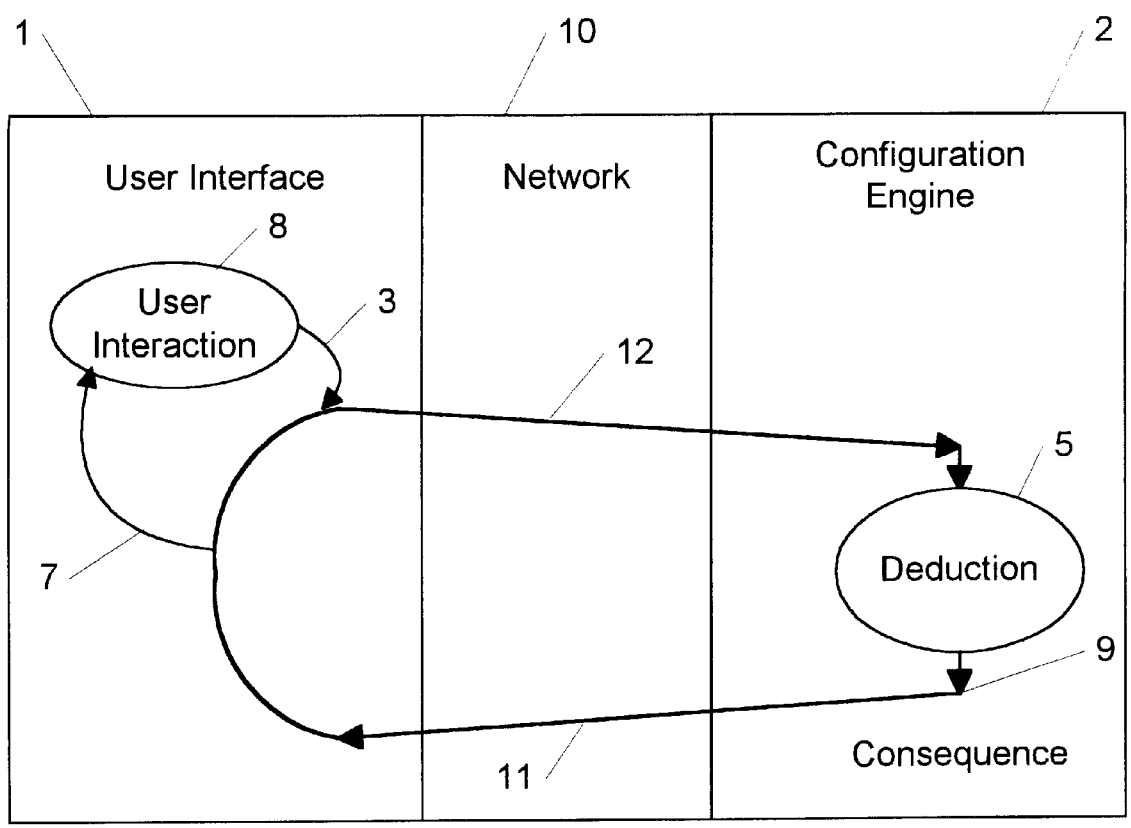
FIG. 2 shows a client/server configuration system.

FIG. 2 shows a client/server configuration system. The configuration cycle is the same as the configuration cycle shown in FIG. 1, but with the addition of multiple sources of delay. This figure illustrates why the method of FIG. 1 is insufficient when large delays are introduced into the system i.e. introduced into the configuration cycle.

The interactive configuration system operates via a network connection 10 that separates the user interface 1 and the configuration engine 2. There are many possible types of network connections to which this description applies.

One type of network connection is a Local Area Network (LAN), i.e. a network connecting a number of computers within a limited geographical area. Examples of such networks are an "Ethernet" or a "Token Ring" net.

A second type of network connection is a connection via a network of networks, i.e. a situation in which many smaller networks are interconnected to form a very large network, possibly allowing connections between computers all over the world. An example of such a network is known as the 'Internet'.

A third type of network connection is a connection where a public telecommunications network is used to connect two computers at two different locations, possibly in two different countries. Examples of such public telecommunications networks are the telephone network and the X.25 network.

FIG. 2 describes the selection cycle when any type of network connection separates the user doing the selections from the configuration engine doing the calculations.

When the user selects an object or an attribute, the request informing the configuration engine of this selection is delayed by the network up-link part 12. The term 'up-link' is used to identify the part of the network connection used for transmitting data from the client to the server.

The calculation 5 of consequences 9 by the configuration engine introduce, a second delay that may be substantial, because configuration problems are generally computationally NP-hard, i.e. the number of calculations necessary increases exponentially with the number of objects, attributes and rules.

The response generated by the configuration engine is delayed by the network down-link part 11, before the consequences can be presented to the user. The term "down-link" is used to identify the part of the network connection used for transmitting data from the server to the client.

Figure 3:
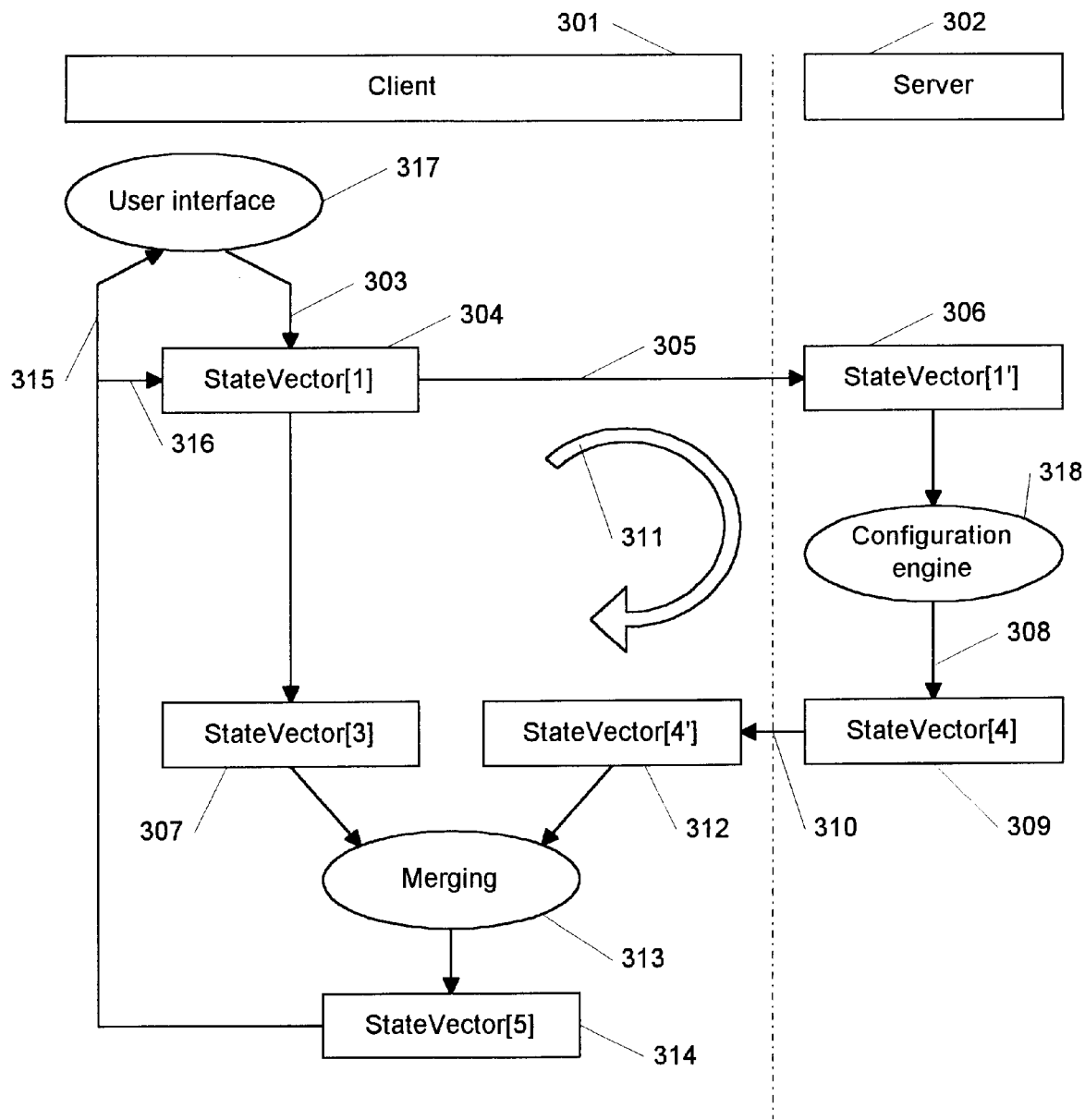
FIG. 3 shows a synchronous configuration cycle according to the invention.

FIG. 3 shows a synchronous configuration cycle according to the invention. The figure shows the flow of information in a configuration system wherein the user interface 317 and the configuration engine 318 are separated by a network having an uplink part 305 and a downlink part 310. The user interface 317 is located at the client 301 and the configuration engine 318 is locate at the server 302.

When the user performs a selection 303, a local state vector, StateVector[1], 304 comprising state information for all selectable objects and attributes is updated to reflect the selection. This state vector is sent as a request to the server 302, which will receive it after a delay DELAY1 introduced by the up-link part 305 of the network connection. The server stores the received request state, StateVector[1'] 306, and uses the information to determine which calculations to perform.

The configuration engine 306 performs a deduction of consequences 308 introducing a DELAY2 due to the HP-hard computational problem. The response generated by the configuration engine 318 is represented in a response state vector, StateVector[4] 309. This state information is transmitted to the client as a response subject to a delay DELAY3 introduced by the network down-link part 310.

The Total Delay 311 is the sum of the three contributing delays, i.e. DELAY1+DELAY2+DELAY3.

The client receives the response state vector, StateVector [4'] 312 which contains state information that is usually different from the local state vector StateVector[3] 307. The client and the server no longer have the same view on the state of the configuration, i.e. the information available to the user is different from the information known by the server.

To solve this problem, a merging unit 313 performing an intelligent combination of the local state vector StateVector [3] 307 and the received response state vector StateVector [4'] 312 is introduced. This generates a merged state vector StateVector[5] 314.

The information in the merged state vector StateVector[5] 314 is used to update the user interface 317, and is used as information 315 for the next user selection cycle. The information in the merged state vector StateVector[5] 314 may be used as new request 316.

Figure 4:
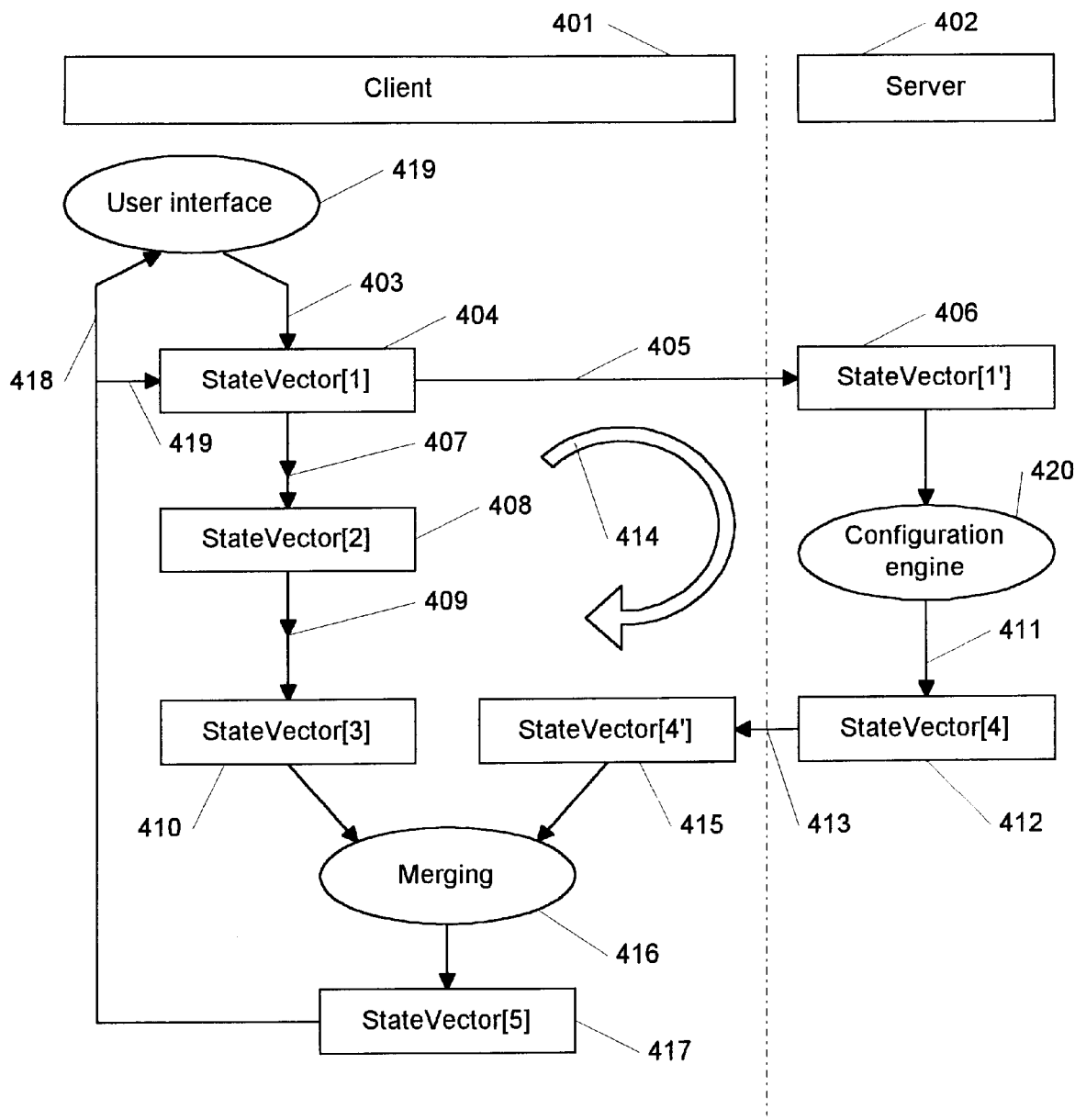
FIG. 4 shows a configuration cycle with transparent synchronization according to the invention.

FIG. 4 shows a configuration cycle with transparent synchronization according to the invention. This cycle provides a better user interface, because the user is allowed to continue interaction without having to wait for the server to complete the processing of a request. This mode of operation is made possible by the merging unit 416, as explained in the following.

The figure shows the user interface 419 and the configuration engine 420. In a preferred embodiment, the user interface and the configuration engine are separated by a network; however, the specific type of network is not important to the object of the invention.

When the user performs a first selection 403, a local state vector, StateVector[1], 404 holding state information for all selectable objects and attributes is updated to reflect the selection. This state vector is sent as a request to the server 402, which will receive it after a DELAY1 introduced by the up-link part 405 of the network connection. The server stores the received request state vector StateVector[1'] 406, and uses the information to determine what type of processing to perform.

After sending the request state vector StateVector[1] 404, the client 431 will allow the user to make a second selection 407. Then a selection will cause the client to update the corresponding state information in an intermediate state vector, StateVector[2] 408. This intermediate state vector is not transmitted to the server, but stored locally. The user may continue to make selections 409 which all results in the intermediate state vector being updated 410.

The server performs a deduction of consequences 411 introducing a DELAY2 due to the HP-hard computational problem. The response generated by the configuration engine 420 is represented in a response state vector StateVector[4] 412. This state information is transmitted to the client subject to a DELAY3 introduced by the network down-link part 413.

The total delay 414 observed by the client when the server is contacted is the sum of the three contributing delays, i.e. DELAY1+DELAY2+DELAY3.

The client receives the response state vector StateVector[4'] 415 which contains state information that is usually different from the latest intermediate state vector StateVector[3] 410. The client and the server no longer have the same view on the state of the configuration, i.e. the information available to the user is different from the information known by the server. To make things worse, the client's view of the state information is not the same as when the request was sent to the server.

To solve this problem, a merging unit 416 performing an intelligent combination of the latest intermediate state vector StateVector[3] 410 and the received response state vector [41] 415 is introduced. This generates a merged state vector StateVector[5] 417. Depending on the information retrieved during the merging operation, the merged state vector can be used in different ways. That is, a number of actions can be taken.

If the information received in the response state vector StateVector[4'] 415 does not invalidate any of the user's selections represented by the intermediate state vector StateVector[3] 410, the user interface is updated with the new information 418, and the merged state vector is used as the information to the user (by means of the user interface 419) regarding more user selections. However, in some situations, the merging unit may find that the user interface should not be updated before the contents of the merged state vector have been verified by sending it to the server as a new request 419, thereby repeating the cycle comprising 405, 411, 413, 416 and 418 or 419.

If the merging unit 416 finds a conflict between the information in the response state vector StateVector[4'] 415 and the intermediate state vector StateVector[3] 410, the information used to update the client 418 will prompt the user to resolve the conflict. The user can do this by making a new client selection 403, starting a new cycle.

The merging unit 416 can actually reduce the number of requests sent to the server. Normally, if the client makes one or more additional selections 407 and 409, these would require a new request to be sent to the server following the merging as described above. However, if the server deduction 411 results in a response state vector StateVector[4'] 415 that is compatible with the latest intermediate state vector StateVector[3] 410, then no new request is necessary. For some product models this can reduce the load on the server significantly.

As can be seen from the above description, the merging unit 416 is a very elegant method of making asynchronous operation work in a manner similar to synchronous operation. The details of the merging unit are described in the following.

TABLE 2

| State | | Symbol | Value | Binary | Explanation |
|---|---|---|---|---|---|
| Client | Selected | S | 1 | 001 | Selected by user |
| | Discarded | D | 2 | 010 | Deselected by user |
| Server | Concluded | C | 3 | 011 | Concluded by configuration engine |
| | Rejected | R | 4 | 100 | Rejected by configuration engine |
| Client/ Server | Free | F | 5 | 101 | Free for selection |
| Impossible | | X | | | (Used to mark impossible states) |

Table 2 shows an example of possible element states.

Table 2 describes a possible definition of the states that each configurable element can take, i.e. 'selected', 'discarded', 'concluded', 'rejected', and 'free'. The states 'concluded' and 'rejected' may be changed by the configuration engine, and where the states 'selected' and 'discarded' may be changed by the user as a result of a user interaction. The state 'free' may be changed by the client as well as the configuration engine. The merging unit may change all the states, if required. Table 2 is by no means exhaustive, but intended as a tool to show the general principle of the invention. An example of a binary encoding of states is shown for completeness, however, this is irrelevant to the general concept.

It may be worth noting that though each configurable element is considered 'binary'—i.e. is either included or excluded—there are two ways in which they can be chosen: by the client: as a consequence of user commands, or by the configuration engine at the server. The four possible combinations can be organized as shown in table 3.

TABLE 3

|  | Included | Excluded |
| --- | --- | --- |
| Client | Selected | Discarded |
| Server | Concluded | Rejected |

Table 3 shows classification of selectable element states.

Equivalent states are states that would cause the configuration to end up with the same subsets of included and excluded elements. In table 3 equivalent states are represented by the two columns. That is, 'selected' is equivalent with 'concluded'.

Contradictory states are states that would cause different subsets of included and excluded elements for the same configuration. In table 3 contradictory states are represented by the two diagonals. That is, selected is in contradiction to rejected.

In addition to the selectable element states, the configurable element may be in an intermediate 'not-yet-selected' state, i.e. the state 'free'. This sums up to a total of 5 states. Other configuration engines may use more or less than 5 states—this is not important to the concept, but the tables described in the following will need to be adjusted accordingly.

The 'selected' state indicates that the user has issued a request to include a specific element in the configuration. It can also be used to indicate that the server has decided to include the element on the user's behalf. An example of this is when the user asks for default values that are predefined for elements, and the server sets the state as if the user did the selection.

The 'deselected' state indicates that the user has issued a request to exclude the element from the configuration. It can also be used to indicate that the server has decided to exclude the element on the user's behalf.

The 'concluded' state indicates that the configuration engine has determined that this element must be included if the constraints of the configuration problem are to be met.

The 'rejected' state indicates that the configuration engine has determined that this element must be excluded if the constraints of the configuration problem are to be met.

The 'free' state indicates that it is still undetermined whether the element is included in or excluded from the configuration.

The 'impossible' state is not a real state, but is used in the following description to indicate combinations of the states in the server and the client, respectively, that cannot occur due to the semantics of assigning states in a configuration problem.

TABLE 4

S S D F R R C C R S F F S R F S

Table 4 shows the contents of a sample state vector.

Table 4 shows an example of a state vector as a simple set of states, describing the state of a system with 16 elements rather than the state of a single element.

Each element of the state vector can take exactly one of the defined element states defined in table 2.

Figure 5:
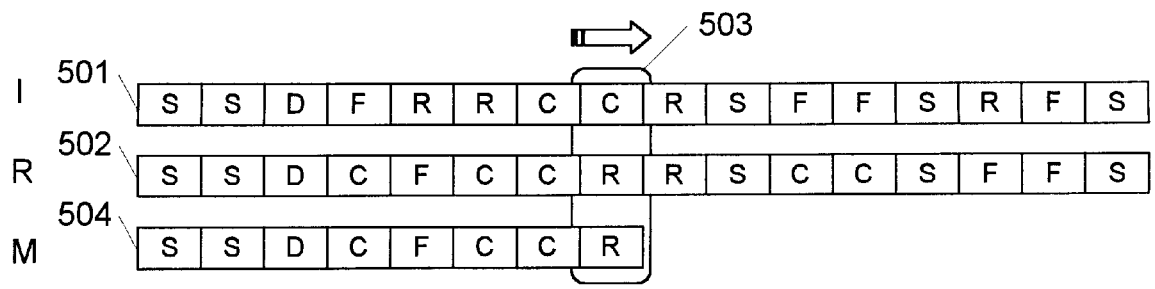
FIG. 5 shows the process of merging state vectors.

FIG. 5 shows the process of merging state vectors. This is the overall operation of the state merging unit introduced in FIG. 3 and FIG. 4. The merging unit takes the latest intermediate state vector I 501 and combines it with the received response state vector R 502. The two vectors are scanned 503, one element at a time, and a merged state vector M 504 is generated.

Tables containing the rules for combining an intermediate element state with a response element state determine the states of the elements in the merged state vector.

TABLE 5

| Response Intermediate | S | D | C | R | F |
| --- | --- | --- | --- | --- | --- |
| S | S/2 | S/0 | C/2 | S/0 | S/1 |
| D | D/0 | D/2 | D/0 | R/2 | D/1 |
| C |  | X |  | C/2 | R/2 | F/2 |
| R |  |  | C/2 | R/2 | F/2 |
| F | F/0 | F/0 | C/2 | R/2 | F/2 |

Table 5 shows a merge table for successful deduction.

Table 5 shows a table for generating the merged information responsive to the response information and the intermediate information. The contents of the table are partly the states caused by the merging indicated by 'S', 'D', 'C', 'R', and 'F', and partly an associated action indicated by the numbers '0', '1', and '2' with the following interpretation:

0 No update of the user interface, set the merged information equal to the intermediate information, and send the merged information as a new request;

1 Update the user interface with the merged information and send the merged information as a new request;

2 Update the user interface with the merged information and do not send the merged information as a new request.

Table 5 shows an example of a merging table that may be applied when the configuration engine has performed a successful deduction, i.e. no contradictions were found in the configuration rule base.

Each row in the table corresponds to a defined state of the latest intermediate state vector. Each column of the table corresponds to a defined state of the received response state vector.

Each entry in the table contains a preliminary action that the combination should initiate.

The principles applied when constructing the merge table for successful deduction is given below.

If the state of the response vector is the same as the state of the intermediate vector, the merged vector also gets this state, and the result can be used for updating the client. This situation corresponds to the diagonal of table 5.

If the state of the response vector is equivalent to the state of the intermediate vector, the merged vector is set to the state of the response vector, and the result can be used for updating the client. Another possibility would be to set the state of the merged vector to the state of the intermediate vector, but this would require the merged vector to be sent to the server as a new request.

If the state of the response vector indicates a choice, but the state of the response vector is different from the state of the intermediate vector, then the merged vector is set to the state of the intermediate vector. The result cannot be used for updating the client, as the merged state vector must first be sent to the server as a new request.

If neither the slate of the intermediate vector nor the state of the response vector indicates a choice by the client, then the state of the merged vector is set to the state of the response vector, accepting the result of the configuration engine. The result is used to update the client.

If the state of the intermediate vector indicates a choice by the client and the state of the response vector indicates that the element is free, then the merged vector is set to the state of the intermediate vector. The result cannot be used for updating the client, as the merged state vector must first be sent to the server as a new request.

TABLE 6

| Response Intermediate | S | D | C | R | F |
|---|---|---|---|---|---|
| S | /0 | /1 | /0 | /0 | /0 |
| D | /1 | /0 | /0 | /0 | /0 |
| C | X | | /0 | X | X |
| R | | | X | /0 | X |
| F | /1 | /1 | /0 | /0 | /0 |

Table 6 shows the merge table for contradictions.

The table contains preliminary action indicated by the numbers '0' and '1' and has the following interpretation:
0 The conflict must be handled by the user;
1 The conflict is possibly resolved, the user is not updated, and the merged information is transmitted as a new request.

Table 6 shows an example of a merging rule table that may be applied when the configuration engine finds a contradiction in the configuration rule base.

Each row in the table corresponds to a defined state of the latest intermediate state vector. Each column of the table corresponds to a defined state of the received response state vector.

Each entry in the table contains the state to give the element in the merged state vector, and a preliminary action that the combination should initiate.

The principles applied when constructing the merge table for contradictions is given below.

If the state of the response vector indicates a choice by the client and the state of the intermediate vector also indicates a choice by the client or that the element is free, then the merged vector is set to the state of the intermediate vector. The reason is that the new choice by the client may be sufficient to solve the contradiction. The result cannot be used for updating of the client, as the merged state vector must first be sent to the server as a new request.

In all other cases, the client is prompted to solve the contradiction.

Figure 6:
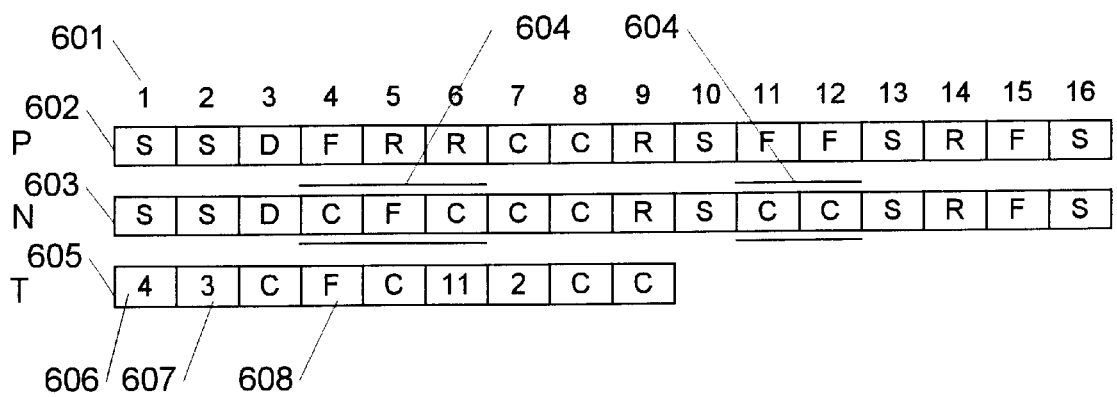
FIG. 6 shows the principle of an efficient encoding of a state vector for transmission.

FIG. 6 shows the principle of an efficient encoding of a state vector for transmission. Each element of an entire state vector is assigned a reference number 601. The state vector representing the previous transmission, P, 602 is compared with the new state vector to be transmitted, N, 603.

The minimum information to be transmitted is the elements where the state was changed between the previous and the new transmission 604. An efficient encoding of this is represented by T 605 where only the intervals of changed elements are transmitted.

Each interval of changed elements is encoded as the index number of the first element in the interval 606, the number of elements in the interval 607, and the state of each element in the interval 608.

Example:

The following is a short example illustrating how the invention works in a preferred embodiment.

For the purpose of illustration, the following object, object attributes and intervals are defined.

TABLE 7

| ID | Configuration Item | Type | Elements | Element Ids |
|---|---|---|---|---|
| 1 | Remote Job | Object | 1 | 1 |
| 2 | Car | Object | 1 | 2 |
| 3 | Engine (1600 cc or 2000 cc) | Object | 2 | 3,4 |
| 5 | Color (Red, Black or White) | Attribute | 3 | 5,6,7 |
| 8 | Power Steering | Object | 1 | 8 |
| 9 | Electric Windows | Object | 1 | 9 |
| 10 | Electric Mirrors | Object | 1 | 10 |
| 11 | Sunroof | Object | 1 | 11 |
| 12 | Number of Trips [1 . . 5] | Interval | 5 | 12,13,14,15,16 |

Table 7 shows a definition of configurable items. The table contains the following information:

Id. This is a numeric value used to identify the configuration items.

Configuration Item. This is a brief specification of the configuration items.

Type. This is the type of the configuration item. For this example, three types are considered: an Object, an Attribute and an Interval.

Elements. This is the number of elements contained in the configurable item.

Element Ids. For each configuration item, this is a list of numeric values used to identify the elements.

For the purpose of illustration the following constraints are defined:

TABLE 8

| Rule Id | Constraints Definition |
|---|---|
| A | RemoteJob => Car |
| B | Car => Engine[cc 1600] OR Engine[cc 2000] |
| C | Engine[cc 1600] OR Engine[cc 2000] => PowerSteering |
| D | 100 * Trips == 400 * Engine[cc 2000] + 500 * Engine[cc 1600] − 100 * SunRoof |
| E | Engine[cc 1600] => ElectricWindows + SunRoof + ElectricMirrors + PowerSteering ≦ 2 |
| F | Engine[cc 2000] => ElectricWindows + SunRoof + ElectricMirrors + PowerSteering ≦ 3 |
| G | Engine[cc 2000] => Color[Red] |

Table 8 shows a definition of constraints. The constraints in this example can be explained as follows:

A) If the user chooses to have a remote job, he must have a car.
B) If a car is chosen, this must have an engine which is one of the two defined types: Either a 1600 cc engine or a 2000 cc engine.
C) If the engine is chosen to be either a 1600 cc or a 2000 cc, the car has power steering.
D) This constraints the number of trips possible. On the left side of the equation, each trip is 100 km. The rule for calculating the total mileage of the car is on the right side of the equation. With a 2000 cc engine, the car normally runs 400 km. With a 1600 cc engine, the car normally runs 500 km. In both cases the mileage is reduced by 100 km if the car has a sunroof.
E) If the engine is 1600 cc, the number of electrically operated accessories is limited to 2.

F) If the engine is 2000 cc, the number of electrically operated accessories is limited to 3.

G) If the 2000 cc engine is chosen, the color of the car must be red.

With a reference to table 4, the state of the configuration problem can be represented as a state vector where each dimension of the vector corresponds to a selectable element in the configuration model. Using the element IDs defined above, this gives the following representation:

TABLE 9

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| Job | Car | Engine | | | Color | | Steer | Win. | Mirr. | Roof | Number of Trips | | | | |
| Job | Car | 1600 | 2000 | Red | Black | White | Steer | Win. | Mirr. | Roof | 1 | 2 | 3 | 4 | 5 |
| F | F | F | F | F | F | F | C | F | F | F | F | F | F | F | F |

Table 9 shows mapping of configuration elements to a state vector. The first row is the element number from table 7.

The second row is the configuration item (using an abbreviated text).

The third row is the configurable elements.

The fourth row is the state vector representation with the states of the elements as they appear after the initial deduction of the consequences of the rules. In most cases the initial state of the elements will be Free (F), but, in this case, the configuration engine deduced from rule C (and the implicit rule that either a 1600 cc or a 2000 cc engine must: be chosen) that power steering is concluded (C).

With reference to FIG. 4, assume that the user selects to have a remote job. The local state 404 will then have the state for element 1 set to selected (S).

TABLE 10

S F F F F F C F F F F F F F

Table 10 shows the local state vector after the first selection. This vector is transmitted to the server. The user now makes a second selection 407, setting the engine to 2000 cc. This will cause the intermediate state vector 408 to be updated for the 3rd element.

TABLE 11

S F S F F F C F F F F F F F

Table 11 shows the local state vector after the second selection.

The server performs a deduction of consequences 411, resulting in a response state vector 412. When this is received by the client, it is merged with the intermediate state vector 410.

Figure 7:
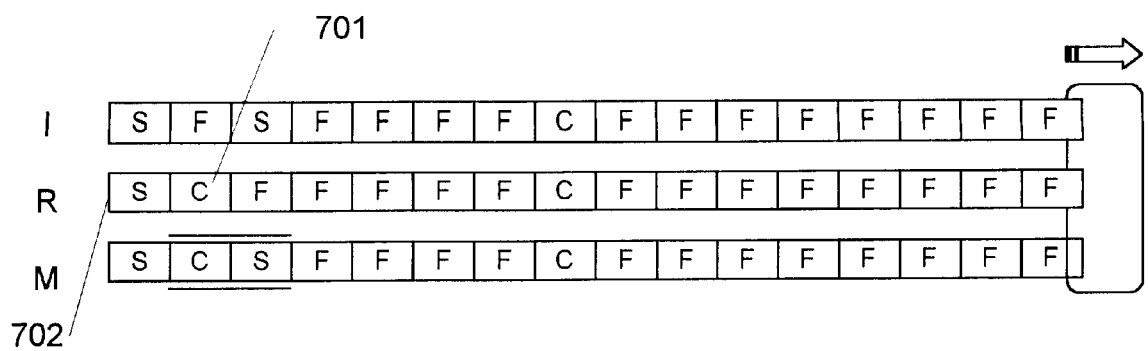
FIG. 7 shows merging of intermediate and result state vectors.

FIG. 7 shows merging of the intermediate state vector with the response state vector containing the consequences deducted by the server based on the first selection. Using constraint "A" in table 7, the server deduced that a Car is necessary, thus setting element 2 701 of the response state vector R 702 to "C".

The merging unit finds according to table 5 that element 2 of the merged state vector is "C" with a preliminary action 2: Use the merged result, no re-send required. When comparing the elements in position 3, however, the merging unit sets the state of the merged element to "S" with action 1: Use the merged state vector, and send this to the server as a new request state vector.

The user interface is updated to reflect the conclusion of a car, and a second cycle is initiated without user intervention, using the merged state vector as a new request state vector.

Figure 8:
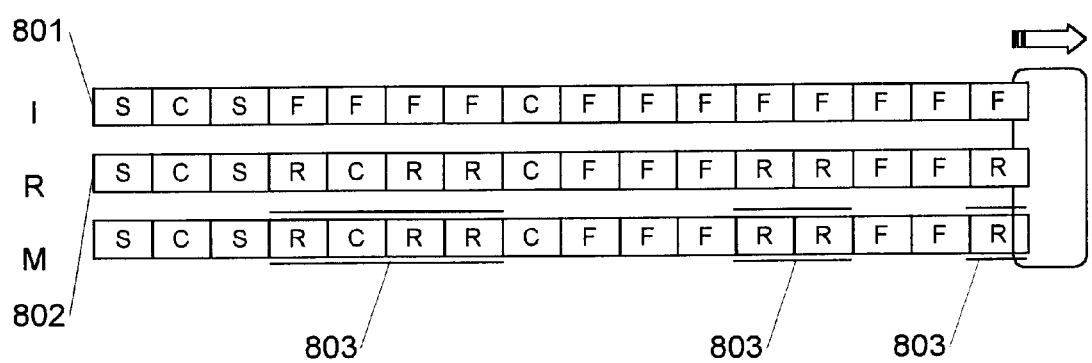
FIG. 8 shows the second merging of state vectors.

FIG. 8 shows the second merging of state vectors. The result M of merging the intermediate state vector, I, 801 with the response state vector, R, 802 following a second deduction of consequences by the server. 803 indicates the changed elements.

In the second deduction, the server concludes that the car does not have a 1600 cc engine (setting element 4 to "R"); further from rule "G" that the color must be Red (setting elements 5, 6 and 7 to "C", "R" and "R" respectively), and from rule "D" that the number of trips cannot be 1, 2 or 5 (setting elements 12, 13 and 16 to "R"). The merging unit finds that element 4, 5, 6, 7, 12, 13 and 16 of the merged state vector should be set to "R", "C", "R", "R", "R", "R" and "R" respectively, and that action 2 (use merged, no re-send) is applicable.

The user interface is updated to reflect the conclusions of the colors and the number of trips, and the client and the server are now synchronized again.

The invention may be embodied as a computer program or a part of a computer program, which may be loaded into the memory of a computer and executed therefrom. The computer program may be distributed by means of any data storage or data transmission medium. The storage media can be magnetic tape, optical disc, compact disc (CD or CD-ROM), mini-disc, hard disk, floppy disk, ferroelectric memory, electrically erasable programmable read only memory (EEPROM), flash memory, EPROM, read only memory (ROM), static random access memory (SRAM), dynamic random access memory (DRAM), ferromagnetic memory, optical storage, charge coupled devices, smart cards, etc. The transmission medium can be a network, e.g. a local area network (LAN), a wide area network (WAN), or any combination thereof, e.g. the Internet. The network may comprise wire and wire-less communication links. Via the network a software embodiment (i.e. a program) of the invention, or a part thereof, may be distributed by transferring a program via the network.

What is claimed is:

1. A method of controlling the flow of information in a client/server system for interactive configuration, wherein a request to a rule base is processed, comprising the steps of:

providing request information, resulting from a first client interaction;

transferring said request information to the server;

collecting intermediate information, resulting from at least one second client interaction succeeding said first client interaction;

creating response information on the server responsive to said request information;

transferring said response information to the client;

determining whether said response information indicates conformity with said rule base;

creating merged information responsive to said intermediate information and said response information;

determining whether said intermediate information represents a higher level of knowledge than said response information;

selecting at least one of the following actions according to said determinations: use said merged information to update said client or transmit said merged information as a request.

2. The method according to claim 1, wherein said request, response, and intermediate information comprise state information for at least one element.

3. The method according to claim 2, wherein said states comprise client states which may be changed as a result of a client interaction and server states which may be changed as a result of server processing.

4. The method according to claim 3, wherein said states further comprise free states which may be changed by the client as well as the server and overruled by said client and server states.

5. The method according to claim 1, wherein said determination of whether said response information is in conformity with said rule base is performed by testing whether said response information comprises a contradiction indication.

6. The method according to claim 3, wherein said client states and said server states may comprise states which are mutually exclusive.

7. The method according to claim 3, wherein at least one of said client states is equivalent with at least one of said server states.

8. The method according to claim 3, wherein said client states comprise the states 'selected' and 'deselected', and wherein said server states comprise the states 'concluded' and 'discarded'.

9. The method according to claim 7, wherein said 'selected' and 'concluded' states are equivalent and wherein said 'deselected' and 'rejected' states are equivalent.

10. The method according to claim 5, wherein a higher level of knowledge may be assumed at least if a free state in said response information is changed to a client state in said intermediate information.

11. The method according to claim 6, wherein a higher level of knowledge may be assumed at least if a contradiction indication is detected and if a client state for an element in said intermediate information excludes a client state for said element in said response information.

12. The method according to claim 9, wherein said further client interaction may be activated if there is contradiction in said response information.

13. The method according to claim 12, wherein said further client interaction may result in a solution to said contradiction, that is, change a state causing said contradiction to another client state.

14. The method according to claim 6, wherein said transmission of said merged information as a further request may be activated if there is contradiction in said response information, and if a first client state in said response information for a given element excludes a second client state in said intermediate information for said given element.

15. The method according to claim 14, wherein said merged information is said intermediate information.

16. The method according to claim 9, wherein said transmission of said merged information as a further request may be activated if there is no contradiction in said response information, and if said client states in said intermediate information are not equivalent to said states in said response information.

17. The method according to claim 8, wherein said transmission of said merged information as a further request may be activated if there is no contradiction in said response information, and if a client state in said response information is changed to a free state in said intermediate information.

18. The method according to claim 8, wherein said client is updated with the merged information, and wherein said merged information is transmitted as a further request if there is no contradiction in said response information, and if a free state in said response information is changed to a client state in said intermediate information.

19. The method according to claim 9, wherein said client may be updated with the merged information, and wherein the merged information is not transmitted as a request if said client states in said intermediate information are equivalent to said response information.

20. The method according to claim 8, wherein said client may be updated with the merged information, and wherein the merged information is not transmitted as a request if said server states in said response information overrule said intermediate information.

21. The method according to claim 8, wherein said client may be updated with the merged information, and wherein the merged information is not transmitted as a request if said server states in said intermediate information overrule said response information.

22. The method according to claim 8, wherein said merged state information is created according to the following rule:

if said response information is equivalent to said intermediate information, then said merged state information may be set similar to said response state information in at least some occurrences.

23. The method according to claim 8, wherein said merged state information is created according to the following rule:

if said server states in said response information are not equivalent to said server states in said intermediate information, then said merged state information is set similar to said response state information in at least some occurrences.

24. The method according to claim 8, wherein said merged state information is created according to the following rule:

if said client states in said intermediate information overrule said response information, then said merged state information is set similar to said intermediate state information in at least some occurrences.

25. The method according to claim 8, wherein said merged state information is created according to the following rule:

if said server states in said response information overrule said intermediate information, then said merged state information may be set similar to said response state information in at least some occurrences.

26. The method according to claim 8, wherein said merged state information is created according to the following rule:

if said free state information occur in said response information and said server state occur in said intermediate information, then said merged information may set to free state information in at least some occurrences.

27. The method according to claim 8, wherein said merged state information is created according to the following rule:

if said free state occurs in said response information and said client state occurs in said intermediate information, then said merged information is set similar to said intermediate state information in at least some occurrences.

28. The method according to claim 2, wherein said elements are merged individually, and wherein each element is associated with an action according to said set of rules.

29. The method according to claim 28, wherein said action is determined for a whole state vector as that action which maximizes client selections while fulfilling system/model constraints.

30. A method of controlling the flow of information in a client/server system for interactive configuration, wherein a request to a rule base is processed, comprising the steps of:

providing request information, resulting from a first client interaction;

transferring said request information to the server;

collecting intermediate information, resulting from a second client interaction succeeding said first client activation;

creating response information on the server responsive to said request information;

transferring said response information to the client; said request, response, and intermediate information may comprise at least two types of information; client states which are provided as a result of a client interaction and server states which are provided as a result of server calculations;

creating merged information responsive to said intermediate information and said response information;

determining an action according to a set of rules, at least comprising the following rules:

if said response information does not contain contradictions, then the client is updated with the merged information for at least some occurrences of request and response information;

if said response Information does not contain contradictions and said response information is not equivalent to said client states in said intermediate information, then the client generates a new server request;

if said response information contains contradictions, then a client interaction is requested for at least some combinations of said intermediate and said response information.

31. The method according to claim 30, wherein said state information is contained in a state vector with a number of elements and wherein each element has a state representation.

32. The method according to claim 31, wherein said elements in said request information are determined as the elements involved in said first client interaction.

33. The method according to claim 31, wherein said elements in said intermediate information are determined as the union of elements comprised by all intermediate information collected after transmission of said request information and before receiving said response information.

34. The method according to claim 31, wherein said elements in said response state vector are determined as the union of elements involved in said first client interaction and the elements which are included in said result of server calculations.

35. The method according to claim 30, wherein at least some combinations of response and request information are impossible.

36. The method according to claim 30, wherein the set of rules further comprises the following rule:

if said response information contains a contradiction and said client states in said response information are different from said client states in said intermediate information, then said contradiction is possibly resolved and said intermediate information is transmitted as request information.

37. The method according to claim 30, wherein the set of rules further comprises the following rule:

if said response information contains a contradiction and said client states occur in said response information and said free states occurs in said intermediate information, then said intermediate state information is transmitted as a server request.

38. The method according to claim 30, wherein the set of rules further comprises the following rule:

if said response information does not contain contradictions and said response information in at least one occurrence contains free state information, then the merged information is further transmitted as a server request for at least one state outcome of said response information.

39. The method according to claim 30, wherein the set of rules further comprises the following rule:

if said response information do not contain any contradictions and said client states occur in said response information and said free states occur in said intermediate information, then said intermediate state information is transmitted as a server request.

40. The method according to claim 30, wherein the set of rules further comprises the following rule:

if said response information does not contain any contradictions and said free state information occurs in said response information and said client state information occurs in said intermediate information, then the merged information is further transmitted as a server request.

41. The method according to claim 30, wherein the set of rules further comprises the following rule:

if said response information does not contain any contradictions and said client or server states in said response information are not equivalent to said client states in said intermediate state information, then said merged state information is transmitted as a server request.

42. The method according to claim 31, wherein said server states and said client states overrule said free state information in said merging process.

43. The method according to claim 31, wherein said merged state information is created according to the following rule:

if said response information is equivalent to said intermediate information, then said merged state information is set similar to said response state information in at least some occurrences.

44. The method according to claim 31, wherein said merged state information is created according to the following rule:

if said server states in said response information are not equivalent to said server states in said intermediate information, then said merged state information is set similar to said response state information in at least some occurrences.

45. The method according to claim 42, wherein said merged state information is created according to the following rule:

if said client states in said response information overrule said intermediate information, then said merged state information is set similar to said intermediate state information in at least some occurrences.

46. The method according to claim 42, wherein said merged state information is created according to the following rule:

if said server states in said response information overrule said intermediate information, then said merged state information is set similar to said response state information in at least some occurrences.

47. The method according to claim 31, wherein said merged state information is created according to the following rule:

if said free state information occur in said response information and said server state occur in said intermediate information, then said merged information is set to free state information in at least some occurrences.

48. The method according to claim 31, wherein said merged state information is created according to the following rule:

if said free state occurs in said response information and said client state occurs in said intermediate information, then said merged information is set similar to said intermediate state information in at least some occurrences.

49. The method according to claim 31, wherein said elements are merged individually, and wherein each element is associated with an action according to said set of rules.

50. The method according to claim 49, wherein said action is determined for a whole state vector as that action which maximizes client selections while fulfilling system/model constraints.

51. A method of controlling the flow of information in a client/server system for interactive configuration, wherein a request to a rule is processed, comprising the steps of:

providing request information, resulting from a client interaction;

transferring said request information to a server;

creating response information on the server responsive to said request information;

transferring said response state information to the client;

creating merged information responsive to said request information and said response information;

determining an action according to a strategy, comprising the following strategy:

if said response information does not contain contradictions, then the client is updated with the merged information for at least some combinations of request and response information;

if said response information contains contradictions, then a client interaction is requested for at least some combinations of request and response information.

52. A computer readable medium encoded with a program for performing a method of controlling the flow of information in a client/server system for interactive configuration, wherein a request to a rule base is processed, comprising the steps of:

providing request information, resulting from a first client interaction;

transferring said request information to the server;

collecting intermediate information, resulting from at least one second client interaction succeeding said first client interaction;

creating response information on the server responsive to said request information;

transferring said response information to the client;

determining whether said response information indicates conformity with said rule base;

creating merged information responsive to said intermediate information and said response information;

determining whether said intermediate information represents a higher level of knowledge than said response information;

selecting at least one of the following actions according to said determinations: use said merged information to update said client or transmit said merged information as a request.

53. The medium according to claim 52, wherein said request, response, and intermediate information comprise state information for at least one element.

54. The medium according to claim 53, wherein said states comprise client states which may be changed as a result of a client interaction and server states which may be changed as a result of server processing.

55. The medium according to claim 54, wherein said states further comprise free states which may be changed by the client as well as the server and overruled by said client and server states.

56. The medium according to claim 52, wherein said determination of whether said response information is in conformity with said rule base is performed by testing whether said response information comprises a contradiction indication.

57. The medium according to claim 54, wherein said client states and said server states may comprise states which are mutually exclusive.

58. The medium according to claim 54, wherein at least one of said client states is equivalent with at least one of said server states.

59. The medium according to claim 54, wherein said client states comprise the states 'selected' and 'deselected', and wherein said server states comprise the states 'concluded' and 'discarded'.

60. The medium according to claim 58, wherein said 'selected' and 'concluded' states are equivalent and wherein said 'deselected' and 'rejected' states are equivalent.

61. The medium according to claim 56, wherein a higher level of knowledge may be assumed at least if a free state in said response information is changed to a client state in said intermediate information.

62. The medium according to claim 57, wherein a higher level of knowledge may be assumed at least if a contradiction indication is detected and if a client state for an element in said intermediate information excludes a client state for said element in said response information.

63. The medium according to claim 60, wherein said further client interaction may be activated if there is contradiction in said response information.

64. The medium according to claim 63, wherein said further client interaction may result in a solution to said contradiction, that is, change a state causing said contradiction to another client state.

65. The medium according to claim 57, wherein said transmission of said merged information as a further request may be activated if there is contradiction in said response information, and if a first client state in said response information for a given element excludes a second client state in said intermediate information for said given element.

66. The medium according to claim 55, wherein said merged information is said intermediate information.

67. The medium according to claim 60, wherein said transmission of said merged information as a further request may be activated if there is no contradiction in said response information, and if said client states in said intermediate information are not equivalent to said states in said response information.

68. The medium according to claim 59, wherein said transmission of said merged information as a further request may be activated if there is no contradiction in said response information, and if a client state in said response information is changed to a free state in said intermediate information.

69. The medium according to claim 59, wherein said client is updated with the merged information, and wherein said merged information is transmitted as a further request if there is no contradiction in said response information, and if a free state in said response information is changed to a client state in said intermediate information.

70. The medium according to claim 60, wherein said client may be updated with the merged information, and wherein the merged information is not transmitted as a request if said client states in said intermediate information are equivalent to said response information.

71. The medium according to claim 59, wherein said client may be updated with the merged information, and wherein the merged information is not transmitted as a request if said server states in said response information overrule said intermediate information.

72. The medium according to claim 59, wherein said client may be updated with the merged information, and wherein the merged information is not transmitted as a request if said server states in said intermediate information overrule said response information.

73. The medium according to claim 59, wherein said merged state information is created according to the following rule:
if said response information is equivalent to said intermediate information, then said merged state information may be set similar to said response state information in at least some occurrences.

74. The medium according to claim 59, wherein said merged state information is created according to the following rule:
if said server states in said response information are not equivalent to said server states in said intermediate information, then said merged state information is set similar to said response state information in at least some occurrences.

75. The medium according to claim 59, wherein said merged state information is created according to the following rule:
if said client states in said intermediate information overrule said response information, then said merged state information is set similar to said intermediate state information in at least some occurrences.

76. The medium according to claim 59, wherein said merged state information is created according to the following rule:
if said server states in said response information overrule said intermediate information, then said merged state information may be set similar to said response state information in at least some occurrences.

77. The medium according to claim 59, wherein said merged state information is created according to the following rule:
if said free state information occur in said response information and said server state occur in said intermediate information, then said merged information may set to free state information in at least some occurrences.

78. The medium according to claim 59, wherein said merged state information is created according to the following rule:
if said free state occurs in said response information and said client state occurs in said intermediate information, then said merged information is set similar to said intermediate state information in at least some occurrences.

79. The medium according to claim 53, wherein said elements are merged individually, and wherein each element is associated with an action according to said set of rules.

80. The medium according to claim 79, wherein said action is determined for a whole state vector as that action which maximizes client selections while fulfilling system/model constraints.

81. A computer readable medium encoded with a program for performing a method of controlling the flow of information in a client/server system for interactive configuration, wherein a request to a rule base is processed, comprising the steps of:
providing request information, resulting from a first client interaction;
transferring said request information to the server;
collecting intermediate information, resulting from a second client interaction succeeding said first client activation;
creating response information on the server responsive to said request information;
transferring said response information to the client; said request, response, and intermediate information may comprise at least two types of information; client states which are provided as a result of a client interaction and server states which are provided as a result of server calculations;
creating merged information responsive to said intermediate information and said response information;
determining an action according to a set of rules, at least comprising the following rules:
if said response information does not contain contradictions, then the client is updated with the merged information for at least some occurrences of request and response information;
if said response information does not contain contradictions and said response information is not equivalent to said client states in said intermediate information, then the client generates a new server request;
if said response information contains contradictions, then a client interaction is requested for at least some combinations of said intermediate and said response information.

82. The medium according to claim 81, wherein said state information is contained in a state vector with a number of elements and wherein each element has a state representation.

83. The medium according to claim 82, wherein said elements in said request information are determined as the elements involved in said first client interaction.

84. The medium according to claim 82, wherein said elements in said intermediate information are determined as the union of elements comprised by all intermediate information collected after transmission of said request information and before receiving said response information.

85. The medium according to claim 82, wherein said elements in said response state vector are determined as the union of elements involved in said first client interaction and the elements which are included in said result of server calculations.

86. The medium according to claim 81, wherein at least some combinations of response and request information are impossible.

87. The medium according to claim 81, wherein the set of rules further comprises the following rule:

if said response information contains a contradiction and said client states in said response information are different from said client states in said intermediate information, then said contradiction is possibly resolved and said intermediate information is transmitted as request information.

88. The medium according to claim 81, wherein the set of rules further comprises the following rule:

if said response information contains a contradiction and said client states occur in said response information and said free states occurs in said intermediate information, then said intermediate state information is transmitted as a server request.

89. The medium according to claim 81, wherein the set of rules further comprises the following rule:

if said response information does not contain contradictions and said response information in at least one occurrence contains free state information, then the merged information is further transmitted as a server request for at least one state outcome of said response information.

90. The medium according to claim 81, wherein the set of rules further comprises the following rule:

if said response information do not contain any contradictions and said client states occur in said response information and said free states occur in said intermediate information, then said intermediate state information is transmitted as a server request.

91. The medium according to claim 81, wherein the set of rules further comprises the following rule:

if said response information does not contain any contradictions and said free state information occurs in said response information and said client state information occurs in said intermediate information, then the merged information is further transmitted as a server request.

92. The medium according to claim 81, wherein the set of rules further comprises the following rule:

if said response information does not contain any contradictions and said client or server states in said response information are not equivalent to said client states in said intermediate state information, then said merged state information is transmitted as a server request.

93. The medium according to claim 82, wherein said server states and said client states overrule said free state information in said merging process.

94. The medium according to claim 82, wherein said merged state information is created according to the following rule:

if said response information is equivalent to said intermediate information, then said merged state information is set similar to said response state information in at least some occurrences.

95. The medium according to claim 82, wherein said merged state information is created according to the following rule:

if said server states in said response information are not equivalent to said server states in said intermediate information, then said merged state information is set similar to said response state information in at least some occurrences.

96. The medium according to claim 93, wherein said merged state information is created according to the following rule:

if said client states in said response information overrule said intermediate information, then said merged state information is set similar to said intermediate state information in at least some occurrences.

97. The medium according to claim 93, wherein said merged state information is created according to the following rule:

if said server states in said response information overrule said intermediate information, then said merged state information is set similar to said response state information in at least some occurrences.

98. The medium according to claim 82, wherein said merged state information is created according to the following rule:

if said free state information occur in said response information and said server state occur in said intermediate information, then said merged information is set to free state information in at least some occurrences.

99. The medium according to claim 82, wherein said merged state information is created according to the following rule:

if said free state occurs in said response information and said client state occurs in said intermediate information, then said merged information is set similar to said intermediate state information in at least some occurrences.

100. The medium according to claim 82, wherein said elements are merged individually, and wherein each element is associated with an action according to said set of rules.

101. The medium according to claim 100, wherein said action is determined for a whole state vector as that action which maximizes client selections while fulfilling system/model constraints.

102. A computer readable medium encoded with a program for performing a method of controlling the flow of information in a client/server system for interactive configuration, wherein a request to a rule is processed, comprising the steps of:

providing request information, resulting from a client interaction;

transferring said request information to a server;

creating response information on the server responsive to said request information;

transferring said response state information to the client;

creating merged information responsive to said request information and said response information;

determining an action according to a strategy, comprising the following strategy:

if said response information does not contain contradictions, then the client is updated with the merged information for at least some combinations of request and response information;

if said response information contains contradictions, then a client interaction is requested for at least some combinations of request and response information.

* * * * *